United States Patent Office 2,797,986
Patented July 2, 1957

2,797,986
PROCESS FOR PRODUCING IMPROVED SUPERPHOSPHATES

Fred P. Zirm, Jr., Wilmington, Del., assignor to E. I. du Pont de Nemours and Company, Wilmington, Del., a corporation of Delaware No Drawing. Application June 25, 1956, Serial No. 593,351

6 Claims. (Cl. 71—40)

This invention is related to a process by which an improved form of superphosphate fertilizer is produced. In particular, this invention is directed to a process of acidulating phosphate rock with sulfuric acid containing a minor proportion of a carbon atom substituted-alkyl betaine.

The manufacture of superphosphate fertilizer involves the reaction of sulfuric acid with ground phosphate rock. This reaction converts the tricalcium phosphate to the more readily available mono- and dicalcium phosphates. In a typical mill operation, the ground phosphate rock, which rock is sometimes referred to as B. P. L. (bone-potash-lime) is dropped from a hopper into a shallow mixing pan. Sulfuric acid, normally about 50–55° Bé., is then added to the rock in the mixing pan and this mixture of acid and rock which is called a "charge" is then agitated; said charge is then dropped from the pan into a large box-car container called a "den." The dens hold about 30 to 50 charges often representing 45 to 75 tons of superphosphate. After the last charge has dropped into the den, the front of the den is opened and is cut into chunks either manually or by power means. The chunks of superphosphate are loaded into elevators which fill small cars which in turn dump the cut "super" onto "piles." A pile consists of numerous dens and often is as large as 1000 tons. The "super" remains in the pile for about 6 weeks for curing which consists of the completion of the reaction begun in the pan mixer. This reaction is measured by analytical tests for available $P_2O_5$, and when these tests indicate that the mass has cured sufficiently, the pile is broken and transferred to the Blending Department or sold as normal "super." Blending involves the addition of potash and nitrogen-containing compounds in the form of an aqueous solution of ammonia, ammonium nitrate and dry potash. This gives a mixture such as the familiar 6-8-6, 6% nitrogen, 8% phosphoric acid, 6% potash.

It is an object of the present invention to provide an improved form of superphosphate fertilizer by acidulating rock with sulfuric acid containing a minor proportion of a carbon substituted-alkyl betaine.

More specifically, the present invention is directed to the process of making superphosphates by reacting sulfuric acid and phosphate rock, said sulfuric acid having incorporated therein from about 0.0035% to 0.05% by weight of the acid of a betaine of the structure,

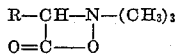

wherein R is an alkyl group of 10 to 16 carbon atoms.

A number of significant advantages result from the above process of incorporating the defined betaine in the manner described. These advantages are (1) a pronounced reduction of the intensity of the acid fumes in the vicinity of the defined reaction. (2) the physical form of the resulting superphosphate may be varied from firm to friable by adjusting the concentration of the defined betaine added, (3) the curing time of the "pile" may be reduced from 6 to 2 weeks, (4) the moisture content of the final product is reduced from 9 to about 7%, and (5) when the superphosphate product of the present invention is blended by treatment with aqueous ammonia solution, said superphosphate absorbs in increased amount of the ammonia.

In carrying out this invention, there is no need to extensively modify the current processes. The additives of this invention may be added directly to the sulfuric acid storage tank if desired, or may also be added to the water line used to dilute the acid prior to its being mixed with phosphate rock. This latter step is easily accomplished by use of a proportioning pump whereby the amount added may be controlled by the rate of delivery of the pump.

As indicated, the amount of additive will be extremely small but will range from about 0.0035 to about 0.05% by weight of the acid used. The amount to be used will depend on several factors; for example, the coarseness or fineness of the rock will influence the amount used; fine rock (90% —100 mesh screen) requires less additive than coarse rock (83% —100 mesh screen). This strength of the acid will also affect the amount of additive. Normally the sulfuric acid used for the acidulation process will be between 52 and 60° Bé. The more concentrated acid will require more of the additive than will the dilute acid. Another factor influencing the amount of additive will be the method by which the den is to be handled. If the den is to be cut mechanically, it must remain erect for the cutting. On the other hand, it may be desirable that the material be entirely friable and collapse readily so that the den can be treated as a coarse powder and readily shoveled. A good starting point is to use the additive in an amount equal to 0.03% based on the amount of 60° Bé. acid used per charge. Variations of this amount as deemed necessary will quickly indicate to skilled personnel the particular concentration that is best suited for the particular requirement.

As indicated, the additives useful in this invention will include C-decyl betaine, C-dodecyl betaine, C-tetradecyl betaine, C-hexadecyl betaine and mixtures of these compounds. These compounds are readily available commercially and are usually obtained as aqueous solutions of varying concentrations, but normally will range from about 15 to about 35% active ingredient. U. S. 2,129,264 (Downing and Johnson to du Pont) discloses the preparation of these compounds.

Another form of phosphate fertilizer is "triple phosphate" which is obtained by acidifying phosphate rock with phosphoric acid instead of sulfuric. The process of this invention is also useful for making "triple phosphate" and requires only the addition of the betaine compounds to the phosphoric acid prior to the acidulation step.

EXAMPLE 1

General process of acidulating phosphate rock

A pan mixer is loaded automatically with 1500 lbs. of finely ground phosphate rock. Sulfuric acid is diluted with water from 60° Bé. to the desired concentration (52° to 58° Bé.) and the diluted acid added to the rock in the pan over a 40-second interval, the rock being agitated during the addition. After the addition of the acid, the mixture is agitated for another 10 to 15 seconds and the mix then dropped to a den below. About 30 charges are prepared in this way and dropped in a den and about 20 minutes after the last charge is dropped, one end of the den is removed for the cutting operation.

The mass in the den is normally a hard, firm, dense mass which requires effort to break it up into small lumps.

EXAMPLE 2

The procedure in Example 1 is repeated except that 2.4 lbs. of a commercially available 25% active ingredient solution of C-cetyl (C-hexadecyl) betaine is added to the water used to dilute the sulfuric acid. The diluted acid is 53.6° Bé. at 98° F. and 1200 lbs. of this acid (on a 60° Bé. basis) containing the agent (0.05% on the weight of 60° Bé. acid) is added to 1500 pounds of a crushed phosphate rock (83% through 90 mesh screen) and the process is carried to completion as described. When the den is opened for cutting the mass is friable and collapses without the need of any mechanical cutting. When this friable material is placed on the "pile" and allowed to cure, it is observed, by analysis for available $P_2O_5$, that a complete cure is obtained in two weeks. On blending this superphosphate with an aqueous solution of ammonia, ammonium nitrate and dry potash, a limited evolution of ammonia fumes is observed indicating a greater than normal absorption of the ammonia.

EXAMPLE 3

Example 1 is repeated except that only 0.33 lb. of the 25% A. I. commercial betaine solution of Example 2 is added to 1200 lbs. of the 60° Bé. acid to give a concentration of betaine of about 0.007% by weight of the acid. The diluted acid tests 53.4° on a Bé. hydrometer at 104° F. The crushed phosphate rock is somewhat finer than in Example 1 (92% through 100 mesh).

Thirty charges are prepared and dropped in a den and after the last charge is dropped, the den is opened 20 minutes later. The mass is less friable than the mass in Example 1, but is considerably more friable than the reaction mass when no betaine is added.

EXAMPLE 4

Example 1 is repeated except that 1.9 lbs. of the commercially available aqueous solution (25% active ingredient) of C-decyl betaine is used to dilute the acid. When the resulting den is opened for cutting the results are the same as in Example 1.

EXAMPLE 5

Example 2 is repeated except that 0.18 lb. of the commercial betaine solution (C-cetyl betaine) is added to the 60° Bé. sulfuric acid to give a 0.0035% solution of the additive. The diluted acid tested 54.0° Bé. at 104° F. When the den is opened, a friable, easily cut mass is obtained compared to the hard, rock-like mass that is obtained without the additive.

In the examples of this invention, the defined betaines, C-decyl, C-dodecyl, C-tetradecyl and C-hexadecyl (C-cetyl) may be substituted interchangeably with the specific betaine additives in the examples to achieve substantially the same results.

I claim:

1. In the process of making superphosphates by reacting sulfuric acid and phosphate rock, the improvement which comprises incorporating into said sulfuric acid, from about 0.0035% to 0.05% by weight of the acid, at least one betaine of the general formula

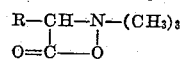

wherein R is an alkyl radical of 10 to 16 carbon atoms.

2. The process of claim 1 wherein the betaine is C-decyl betaine.

3. The process of claim 1 wherein the betaine is C-dodecyl betaine.

4. The process of claim 1 wherein the betaine is C-tetradecyl betaine.

5. The process of claim 1 wherein the betaine is C-hexadecyl betaine.

6. The process of claim 1 wherein a mixture of the betaines is incorporated into the sulfuric acid.

No references cited.